US010880784B2

United States Patent
Chun et al.

(10) Patent No.: US 10,880,784 B2
(45) Date of Patent: Dec. 29, 2020

(54) COMMUNICATION METHOD USING CONTEXT INFORMATION OF TERMINAL IN WIRELESS COMMUNICATION SYSTEM, AND BASE STATION

(71) Applicant: LG ELECTRONICS INC., Seoul (KR)

(72) Inventors: Sungduck Chun, Seoul (KR); Jinsook Ryu, Seoul (KR); Hyunsook Kim, Seoul (KR); Laeyoung Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 15/744,564

(22) PCT Filed: Aug. 4, 2016

(86) PCT No.: PCT/KR2016/008601
§ 371 (c)(1),
(2) Date: Jan. 12, 2018

(87) PCT Pub. No.: WO2017/023129
PCT Pub. Date: Feb. 9, 2017

(65) Prior Publication Data
US 2018/0213446 A1 Jul. 26, 2018

Related U.S. Application Data

(60) Provisional application No. 62/201,113, filed on Aug. 5, 2015.

(51) Int. Cl.
*H04W 8/22* (2009.01)
*H04W 8/24* (2009.01)
(Continued)

(52) U.S. Cl.
CPC ............ *H04W 28/26* (2013.01); *H04W 8/22* (2013.01); *H04W 8/24* (2013.01);
(Continued)

(58) Field of Classification Search
CPC ....... H04W 8/22; H04W 76/10; H04W 76/15; H04W 76/27
See application file for complete search history.

(56) References Cited

U.S. PATENT DOCUMENTS

| 2002/0006117 A1 * | 1/2002 | Duske, Jr. .......... H04B 7/18567 370/316 |
| 2013/0051288 A1 | 2/2013 | Yamada et al. |

(Continued)

OTHER PUBLICATIONS

Proebster, et al.: "Context-aware resource allocation for cellular wireless networks", EURASIP Journal on Wireless Communications and Networking, Jul. 12, 2012, pp. 2-4.
(Continued)

*Primary Examiner* — Raj Jain
(74) *Attorney, Agent, or Firm* — Dentons US LLP

(57) ABSTRACT

Disclosed are a communication method and a base station, the communication method comprising: receiving, from a network entity, a message including context capability information and context type information of a terminal; transmitting, to the terminal, a context request message requesting the transmission of particular context information among the context information supported by the terminal; receiving, from the terminal, a context response message including the context information of the terminal; and changing configuration values of radio resources on the basis of the context information.

12 Claims, 11 Drawing Sheets

(51) Int. Cl.
H04W 28/02 (2009.01)
H04W 28/26 (2009.01)
H04W 72/04 (2009.01)
H04W 88/08 (2009.01)

(52) U.S. Cl.
CPC ..... *H04W 72/0406* (2013.01); *H04W 72/048* (2013.01); *H04W 28/0215* (2013.01); *H04W 88/08* (2013.01)

(56) References Cited

U.S. PATENT DOCUMENTS

| | | | |
|---|---|---|---|
| 2014/0192717 A1 | 7/2014 | Liu et al. | |
| 2015/0271806 A1* | 9/2015 | Kim | H04W 24/10 455/452.1 |
| 2016/0183230 A1* | 6/2016 | Park | H04W 76/10 455/452.2 |
| 2017/0071021 A1* | 3/2017 | Jin | H04W 76/27 |
| 2018/0020431 A1* | 1/2018 | Cho | H04W 72/042 |
| 2018/0213446 A1* | 7/2018 | Chun | H04W 28/26 |

OTHER PUBLICATIONS

Abou-Zeid, et al.: "Towards Mobility-Aware Predictive Radio Access: Modeling, Simulation, and Evaluation in LTE Networks", In: Proceedings of the 17th ACM International Conference on Modeling, Analysis and Simulation of Wireless and Mobile Systems, Sep. 21, 2014, sections 2-4.

NGMN Alliance: "NGMN 5G White Paper", Feb. 17, 2015, http://ngma.org/fileadmin/ngmn/content/downloads/Technical/2015/NGMN_5G_White_Paper_V1_0.pdf, pp. 22, 25, 28, 31, 44.

* cited by examiner

ND STAGE ENTRY

COMMUNICATION METHOD USING CONTEXT INFORMATION OF TERMINAL IN WIRELESS COMMUNICATION SYSTEM, AND BASE STATION

This application is a 35 USC § 371 National Stage entry of International Application No. PCT/KR2016/008601 filed on Aug. 4, 2016, and claims priority to U.S. Provisional Application No. 62/201,113 filed on Aug. 5, 2015, all of which are hereby incorporated by reference in their entireties as if fully set forth herein.

TECHNICAL FIELD

Following description relates to a wireless communication system, and more particularly, to a method for a base station to perform communication using context information of a user equipment in a wireless communication system and the base station.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Problems

An object of the present invention is to propose a communication mechanism using context information of a user equipment in a wireless communication system.

Another object of the present invention is to provide a service appropriate for a user equipment in a manner that network entities as well as an application server utilize context information of the user equipment.

The other object of the present invention is to efficiently utilize a radio resource by introducing a cloud scheme applied to a next generation communication system.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of performing communication, which is performed by a base station using context information of a terminal in a wireless communication system, includes the steps of receiving a message including context capability information indicating whether or not the terminal provides context information and context type information indicating a type of the context information supported by the terminal from a network entity, transmitting a context request message for requesting specific context information among the context information supported by the terminal to the terminal, receiving a context response message including context information, which is generated based on information generated in an application layer of the terminal, from the terminal, and changing a configuration value of a radio resource based on the context information.

The changing step can further includes the steps of selecting different base stations related to the terminal based on the context information and transmitting a resource reservation message for requesting reservation of a radio resource for the terminal to the different base stations.

The method can further include the steps of receiving a resource reservation response message indicating that the reservation of the radio resource for the terminal is authorized from the different base stations and informing the terminal of the completion of the reservation of the radio resource.

The context information included in the context response message can include at least one selected from the group consisting of scheduling information, location information, and time information of a user of the terminal.

The reservation of the radio resource can be reserved for the terminal by a prescribed base station at a prescribed location at prescribed time according to the context information included in the context response message.

If a base station among the different base stations is unable to reserve a radio resource according to the resource reservation message, the base station may ask a network entity configured to manage radio resources to allocate an additional radio resource.

The network entity may correspond to an MME (mobility management entity).

To further achieve these and other advantages and in accordance with the purpose of the present invention, according to a different embodiment, a base station includes a transmitter, a receiver, and a processor configured to operate in a manner of being connected with the transmitter and the receiver, the processor configured to receive a message including context capability information indicating whether or not the terminal provides context information and context type information indicating a type of the context information supported by the terminal from a network entity, the processor configured to transmit a context request message for requesting specific context information among the context information supported by the terminal to the terminal, the processor configured to receive a context response message including context information, which is generated based on information generated in an application layer of the terminal, from the terminal, the processor configured to transmit a resource reservation message for requesting reservation of a radio resource for the terminal to different base stations which are selected based on the context information.

Advantageous Effects

As is apparent from the above description, the embodiments of the present invention have the following effects.

First of all, since it is able to perform communication using context information of a user equipment, it is able to provide a user with a service optimized to the user of the user equipment.

Second, since not only an application server but also network entities are able to utilize context information of a user equipment, the network entities can organically operate with each other.

Third, since a radio resource is utilized according to context information of a user equipment, it is able to reduce radio resource waste, thereby reducing cost of a service provider.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
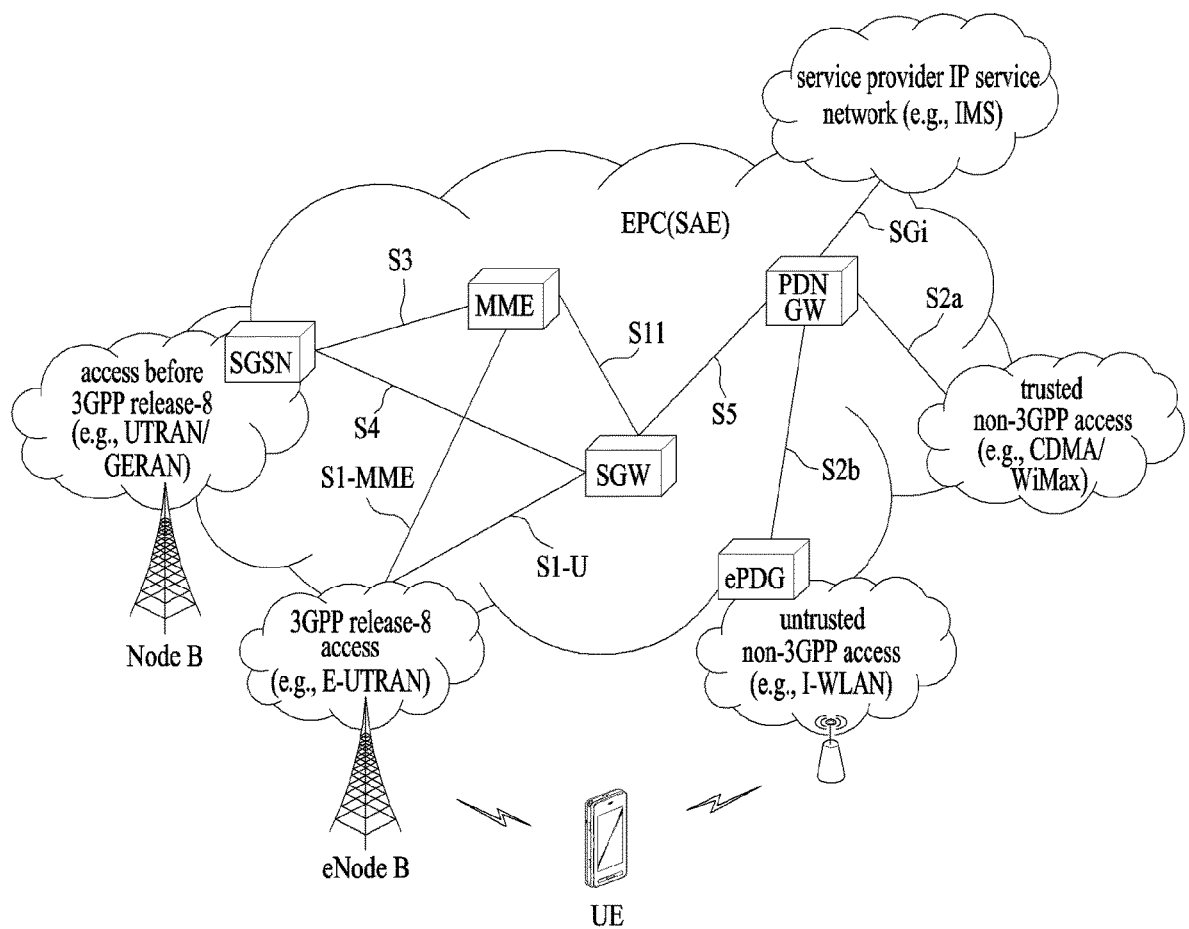
FIG. 1 is a diagram illustrating a brief structure of an evolved packet system (EPS) that includes an evolved packet core (EPC)

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE)/LTE-Advanced (LTE-A) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP(SUPL Location Platform): entity that controls Location Service Management and Position Determination. The SLP includes SLC(SUPL Location Center) function and SPC(SUPL Positioning Center) function. Details of the SLP will be understood with reference to Open Mobile Alliance(OMA) standard document OMA AD SUPL: "Secure User Plane Location Architecture".

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the |

TABLE 1-continued

| Reference point | Description |
|---|---|
| | Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
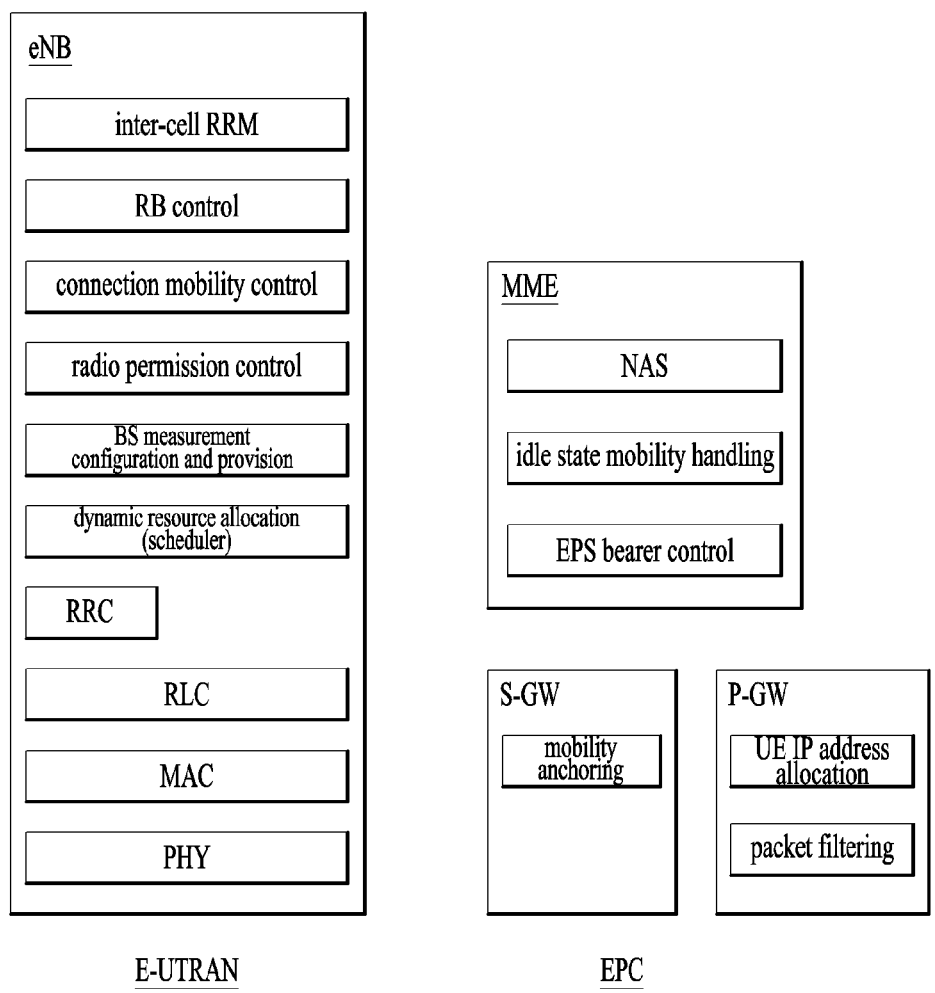
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
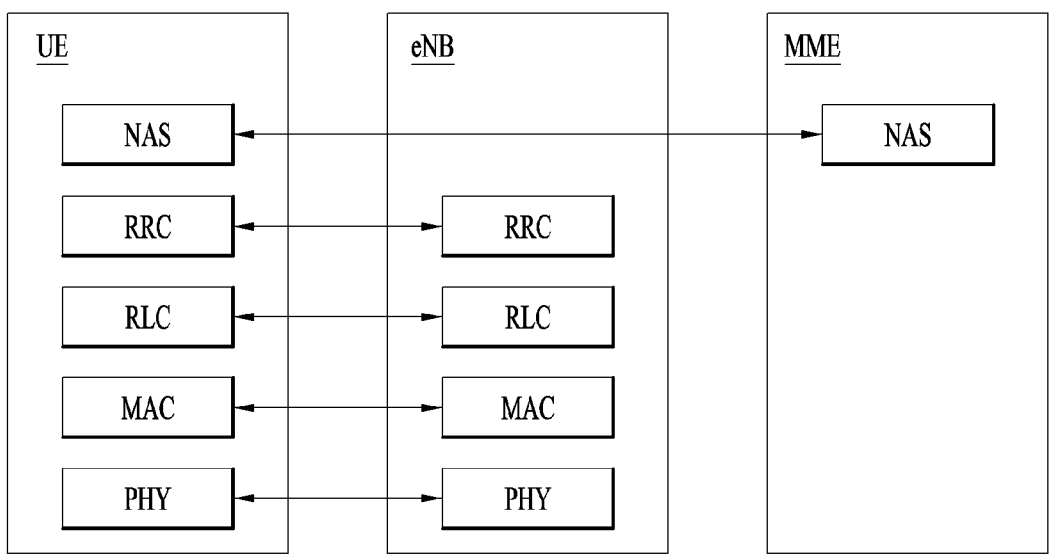
FIG. 3 is an exemplary diagram illustrating a structure of a radio interface protocol on a control plane.
Figure 4:
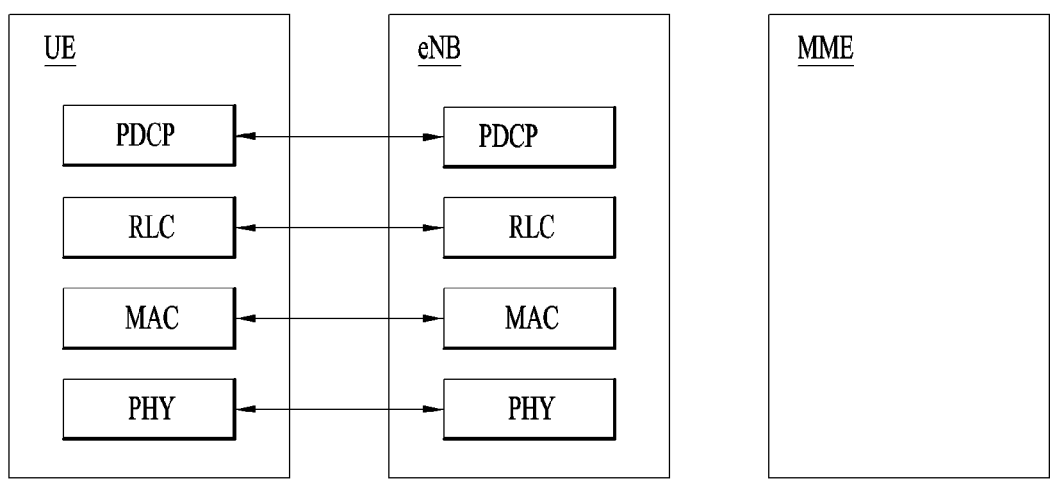
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
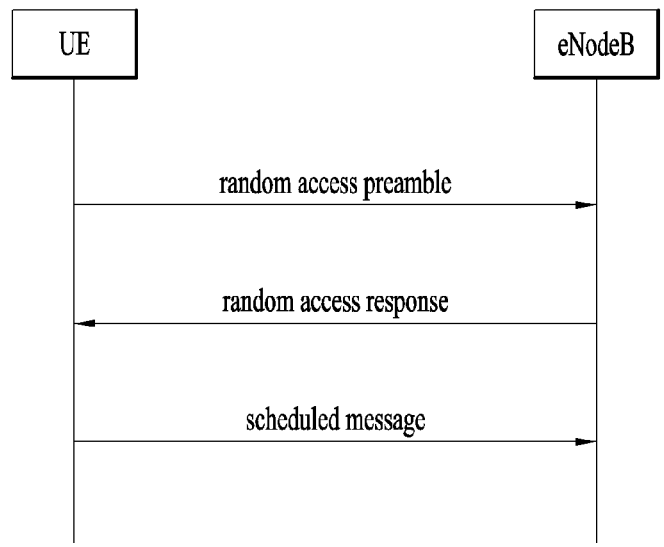
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
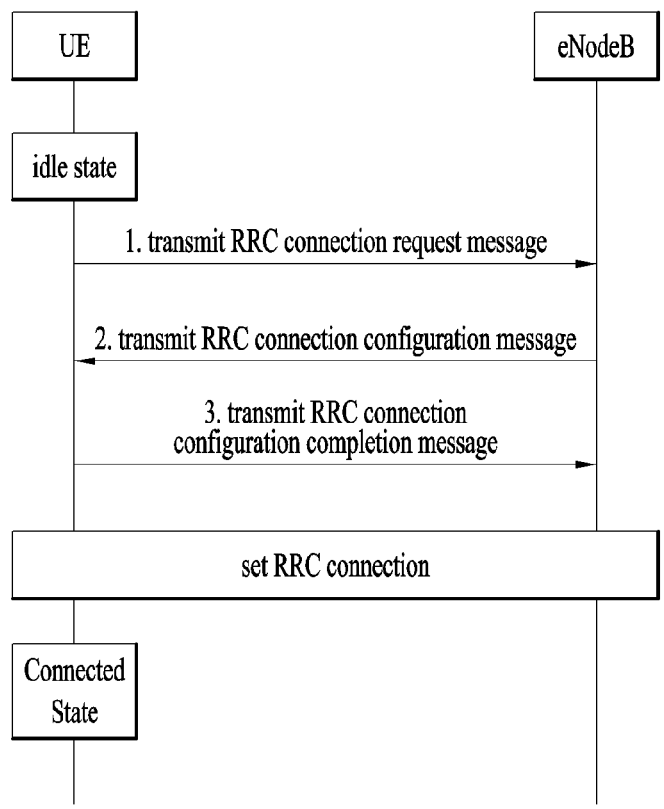
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. V2X (Vehicle to Everything) Communication

Figure 7:
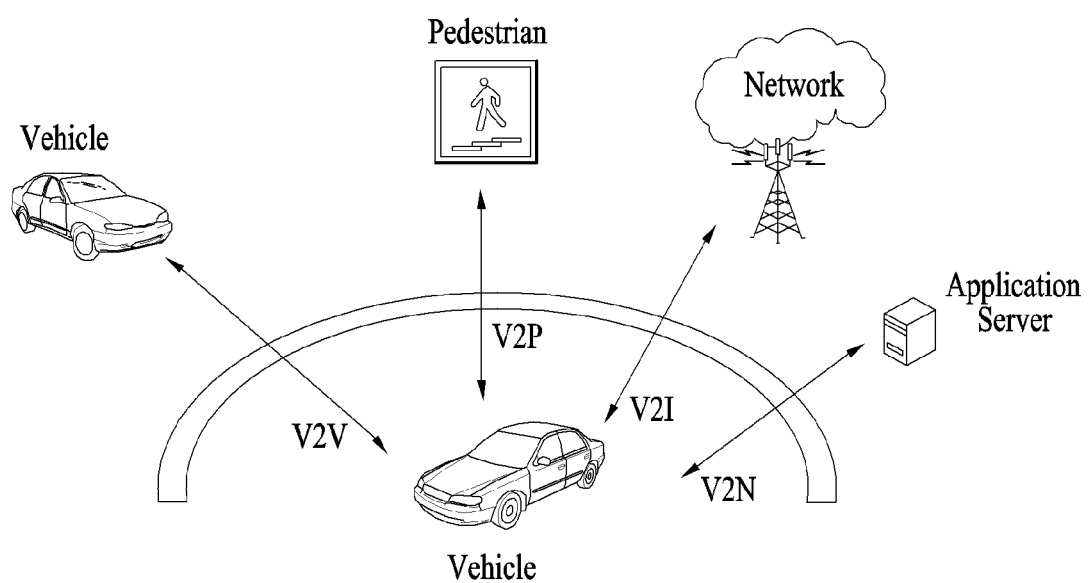
FIG. 7 is a diagram for V2X (vehicle to everything) communication environment.

FIG. 7 is a diagram showing a V2X (vehicle to everything) communication environment.

If a vehicle accident occurs, many lives are lost and serious property damage is caused. Hence, the demand for a technology capable of securing pedestrian's safety as well as vehicle boarded person's safety is increasingly rising. Hence, a vehicle-specified hardware and software based technology is grafted onto a vehicle.

An LTE based V2X (vehicle-to-everything) communication technology having started from 3GPP reflects the tendency of grafting an IT (information technology) technology onto a vehicle. Connectivity function is applied to some kinds of vehicles, and many efforts are continuously made to research and develop V2V (Vehicle-to-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. Having received the broadcasted information, a nearby vehicle utilizes the information for accident prevention by recognizing movements of other vehicles moving nearby.

Namely, in a similar manner that an individual person carries a user equipment in shape of a smartphone, a smartwatch or the like, a user equipment (hereinafter abbreviated UE) in specific shape is installed in each vehicle. Here, a UE installed in a vehicle means a device actually provided with a communication service from a communication network. For example, the UE installed in the vehicle can be provided with a communication service by being connected to an eNB.

Yet, various items should be considered for a process for implementing V2X communication in a vehicle. This is because astronomical costs are required for the installation of traffic safety facilities such as V2X base station and the like. Namely, in order to support V2X communication on all vehicle-movable roads, it is necessary to install hundreds or thousands of V2X base stations or more. Moreover, since each network node accesses Internet or a central control server using a wired network basically for stable communication with a server, installation and maintenance costs of the wired network are high.

Meanwhile, prior to the description of the proposed V2X communication method, several kinds of terms to be used in the following specification are defined first.

RSU (road side unit): This is an entity supportive of V2I communication and means an entity capable of performing a transmission/reception to/from a UE using a V2I application. The RSU can be implemented in an eNB or UE (particularly, a stationary UE). An eNB or UE operating as RSU collects information (e.g., traffic light information, traffic volume information, etc.) related to traffic safety and/or information on nearby vehicle movement, transmits information to another UE becoming a target of V2I communication, and receives information from another UE.

V2I communication: This is a type of V2X communication. A UE and RSU that use V2I application become main agents of the communication.

V2N communication: This is a type of V2X communication. A UE and serving entity that use V2N application become main agents of the communication and communicate with each other through an LTE network entity.

V2P communication: This is a type of V2X communication. Two UEs that use V2P application become main agents of the communication.

V2V communication: This is a type of V2X communication. Two UEs that use V2V application become main agents of the communication. V2V communication differs from V2P communication in the following. In the V2P communication, a prescribed UE becomes a UE of a pedestrian. In the V2V communication, a prescribed UE becomes a UE of a vehicle.

Uu interface (or, E-UTRAN Uu interface): This means an interface between a UE and an eNB defined in LTE/LTE-A. With respect to a relay node, this interface may mean an interface between a relay node and a UE.

Un interface: This means an interface between a relay node and an eNB. This interface means an interface used for transmission and reception performed in MBSFN (MBMS (multimedia broadcast/multicast services) over single frequency network) subframe.

PC5 interface: This means an interface used for direct communication between two UEs. This interface is used for communication between devices supportive of ProSE (proximity service).

DSRC (dedicated shiort range communications): This means a protocol and standard specification used for short-range or medium-range wireless communication for vehicles. Communication is performed using an interface different from the Uu, Un and PC5 interfaces.

3. Communication Method Using Context Information

When the study on LTE system and SAE system has started, the greater part of mobile terminals includes few sensors. Hence, a standard specification has been enacted without a specific consideration on an operation of a device or a sensor. As a result, a current cellular system is unable to sufficiently utilize specific information of such a terminal as a smartphone or a wearable device. Moreover, since the cellular system strictly seeks the separation of each protocol layer in general, it is not easy for network nodes to utilize context information of a terminal.

Meanwhile, utilization of context information gradually becomes easy. As OS and applications of an intelligent mobile terminal are disseminated, users tend to give more authority to applications requiring personal information and sensor information. In order to improve productivity, users allow applications to access a personal schedule, e-mail, location information, contact information and the like of the users. And, many advertisement platforms used for an application provide a user with advertisement and recommendation information customized to the user via big data analysis.

In this viewpoint, it is necessary for a next generation network system to utilize not only context information of a user but also sensor information sensed by each of sensors. The information can be utilized to provide a service optimized to a scenario of each user.

According to a recent trend, a user terminal is implemented by a smartphone. In the aspect of hardware, a smartphone is implemented by including a plurality of sensors including an acceleration sensor, a gyroscope sensor, a magnetic sensor, an altitude sensor, a proximity sensor, a GPS sensor, and the like. Moreover, the smartphone supports various wireless access technologies including Bluetooth, WiFi, NFC (near field communication), and the like. Information collected by the sensors and the access technologies can be used not only by applications of the smartphone but also by a network node. Since many applications and operating systems request user permission for accessing context information, it is necessary for a next generation system to have capability capable of searching for the context information.

In the following, a method of performing communication using context information is explained with reference to embodiments shown in FIGS. 8 to 12. First of all, FIGS. 8 and 9 show a legacy communication method using context information and explain a background that a proposed embodiment is derived from the legacy communication method.

According to the legacy communication method, since a layer in charge of communication is separated from a layer in charge of an application, interaction between layers is limitative. In particular, according to an OSI 7-layer model, layers positioned below an application layer operate in a state that the layers do not know information transmitted and received in the application layer.

However, in order for a communication layer, which is in charge of transmitting information of the application layer, to more efficiently operate, it is necessary for the communication layer positioned below the application layer to widely use the information of the application layer. For example, in order to make the communication layer more efficiently operate, it is necessary for the communication layer to configure a prescribed parameter value using external information (e.g., information of the application layer or hardware information of an entity implementing the communication layer) or utilize the external information for a network operation. As a different example, a current beamforming technology adjusts a transmission/reception parameter using a predetermined signal pattern without a relative position between a base station and a terminal or information on an obstacle. In this case, if the base station is able to know a terminal position and use information on a building or an obstacle near the terminal, it may be able to more quickly and efficiently perform beamforming on the terminal. For example, when the base station transmits configuration information on environment/parameter to the terminal to apply beamforming, MIMO technique, and the like to the terminal, the base station can indicate the terminal to transmit information (location/speed/moving direction, etc.) on the terminal to a network with a prescribed condition or an interval. Subsequently, the base station reduces candidates of beams/parameters to be applied to the terminal according to the information on the location/speed/moving direction, etc. transmitted by the terminal and can promptly determine a best value.

Figure 8:
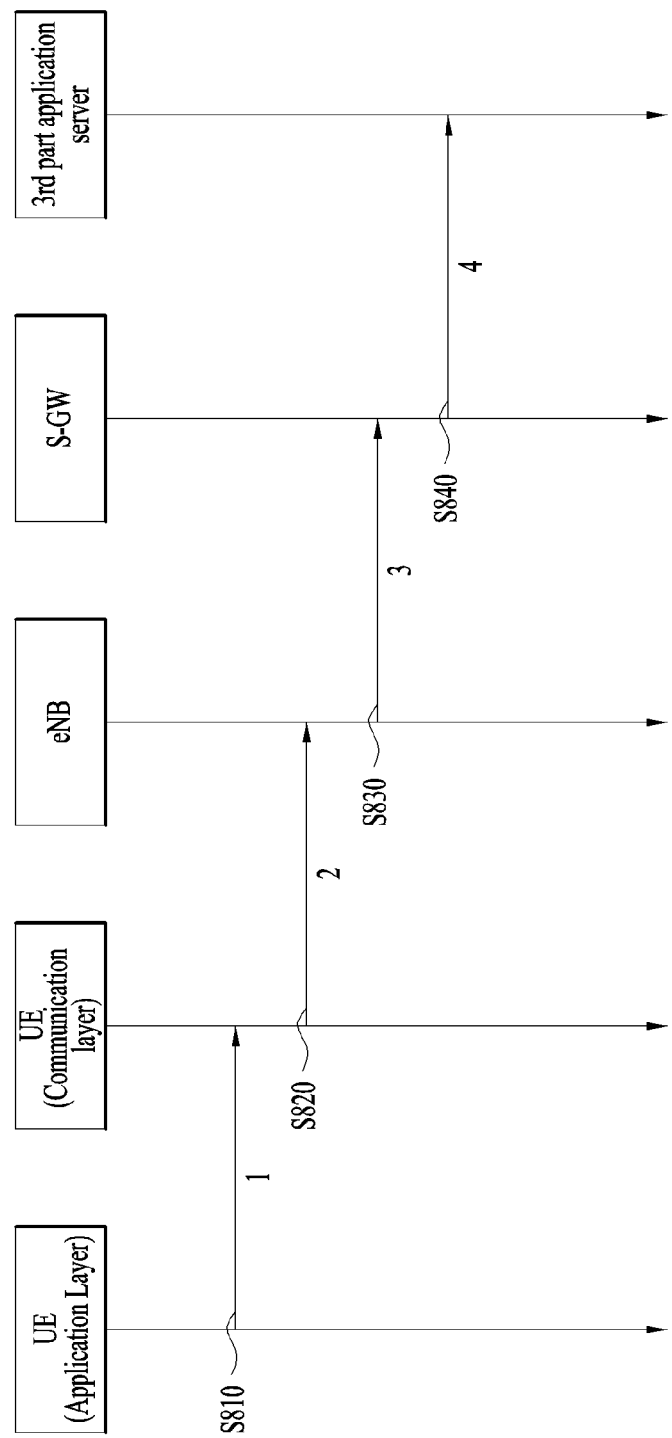
FIG. 8 is a flowchart for explaining an embodiment related to a proposed V2X communication method.
Figure 9:
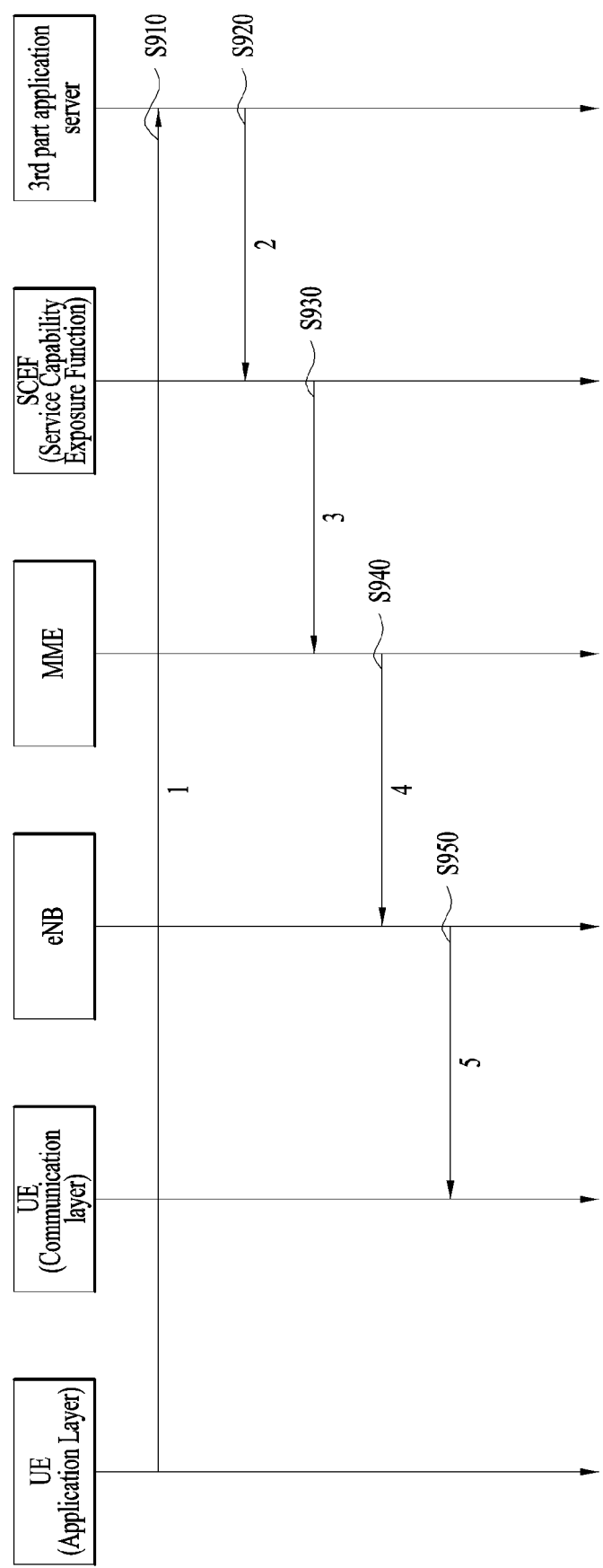
FIG. 9 is a flowchart for explaining a different embodiment related to a proposed V2X communication method.

In the following, a problem of the related art shown in FIG. 8 is explained. It may consider a method of forwarding application information to an application server corresponding to a terminal end as a method for a wireless communication network to use information of an application dynamically performed in a terminal.

First of all, an application layer of a terminal generates information related to an application to configure a data packet and forwards the data packet to a communication layer of the terminal [S810]. Subsequently, the communication layer of the terminal transmits the forwarded data packet to an eNB [S820]. In this case, the eNB can be configured to have a new layer for analyzing the data packet of the application layer. In particular, the eNB analyzes contents of the received data packet, coverts the contents into a value necessary for radio configuration, and informs the terminal of a change of a configuration value if necessary. Subsequently, the eNB forwards the data packet to an SGW [S830]. Similar to the eNB, the SGW analyzes contents of the received data packet, coverts the contents into a value necessary for radio configuration, and informs the terminal of a change of a configuration value if necessary. The SGW forwards the data packet to an application server via a PGW [S840].

The procedures mentioned earlier in FIG. 8 have a limit described in the following. It is necessary for an eNB, an SGW, and an MME to implement an application layer in additional to a legacy communication layer. A data format used in each application is different according to a manufacturer of an application and an interpretation method is different as well. Hence, it is necessary to additionally implement the application layer in the eNB, the SGW, and the MME to interpret application information included in a data packet. However, since a plurality of terminals use a different application and there are many types and numbers of an application performing the same role, the abovementioned scheme has a limit in that it is necessary to interpret the huge number of applications in the eNB, the SGW, and the MME.

And, the application layer uses an encryption scheme configured by each application as it is when peer-to-peer information forwarding is performed. If information generated by an application of a terminal is transmitted in a manner of being encrypted, since an eNB and an SGW do not have information necessary for decoding a data packet, the eNB and the SGW are unable to know contents included in the data packet. In particular, since the terminal corresponding to a generating side of information and an application server corresponding to a receiving side of the information know the contents only, it is difficult for a middle node to know the contents.

In the following, a problem of the related art shown in FIG. 9 is explained. A scheme of using an SCEF (service capability exposure function), i.e., an interworking function laid between 3GPP network and an application server, is explained in FIG. 9.

First of all, an application layer of a terminal transmits application information to an application server [S910]. The application server determines information regarded as information necessary for a communication layer of the terminal and transmits a determined result to an SCEF [S920]. The SCEF exists between 3GPP communication network and an external application server and plays a role in providing an interface. The SCEF forwards information received from the application server to an MME [S930] and the MME forwards the received information to an eNB related to the terminal [S940]. An application layer of the eNB analyzes the information received from the MME, converts the information into a value necessary for radio configuration, and inform the terminal of a change of a configuration value if necessary [S950].

The procedures mentioned earlier in FIG. 6 also have a limit. In the aspect of managing the application server, it is necessary to know whether a client using a service of the application server uses 3GPP network or WiFi or fixed broadband to access the application server. This leads to the increase of development cost and complexity. In particular, since the operation of FIG. 9 is applied to only a client accessing the application server via 3GPP network, if a data packet is received from a certain client, it is necessary for the application server to detect whether or not the data packet is received via the 3GPP network. If it is detected that the data packet is received via the 3GPP network, it is necessary for the application server to detect whether or not the data packet is received through a 3GPP service provider supporting the SCEF. Since the 3GPP network is connected with an external internet in wired, it is difficult for the application server to know whether or not a client uses the 3GPP network.

Moreover, if a communication layer utilizes information of an application layer, it may obtain such a gain as battery saving of a terminal, 3GPP network resource optimization, and the like. The gain corresponds to a gain between a network and a terminal. In the aspect of a manager of the application server, the manager has almost no gain. Hence, the scheme described in FIG. 9 has a limit in that it is difficult to practically apply the scheme.

In the following, a proposed embodiment is explained in consideration of the aforementioned problems with reference to FIGS. 10 to 12. According to the proposed embodiment, a terminal and a network entity exchange context information with each other. The network entity may correspond to various communication nodes participating in a procedure of providing a service to the terminal such as an eNB, an MME, an SGW, a PGW, an application server, and the like.

First of all, when the terminal accesses a network, the terminal informs the network entity of whether or not the terminal has capability capable of transceiving context information with the network entity. This procedure can be initiated using signaling signaled by the network entity to query context information to be informed by the terminal. For example, the network entity can query the context information to be informed by the terminal by transmitting a context capability query message to the terminal.

Subsequently, the terminal informs the network entity of whether or not the terminal has capability capable of informing the network entity of the context information in response to the query of the network entity. The terminal can also inform the network entity of a type of the context information. This procedure can be performed by transmitting a context capability response message.

Meanwhile, information indicating a type of context information to be transmitted to the network entity is referred to as context type information. An indicator indicating the type of the context information to be transmitted to the eNB can be configured in advance. For example, location information and schedule information can be mapped to a 'location' indicator and a 'calendar' indicator, respectively. In particular, if the indicator indicating the context type information is transceived between the terminal and the network entity, the terminal and the network entity can efficiently transceive the context type information with each other. Meanwhile, the terminal and the network entity ignore context type information not supported by the terminal and the network entity or context type information incapable of being understood by the terminal and the network entity. Although the context type information not supported or incapable of being understood by the terminal and the network entity is received, the context type information is not processed.

The network entity may not charge for a data packet used for forwarding the context information and the context type information. Or, the network entity may exclude the charge from the total charged amount. Hence, the amount of context information provided by a user may increase.

Having received a response for context information capable of being informed by the terminal, the network entity transmits configuration information to the terminal to inform the terminal of a type and timing of context information to be transmitted. The terminal transmits context information to the network entity according to the configuration information. This procedure can be performed by transceiving a context request message and a context response message between the terminal and the network entity. When the network is periodically triggered or is triggered by a specific event, the network can transmit the configuration information to the terminal to make the terminal transmit the context information. In this case, if a type of context information requested by the network entity corresponds to information not allowed by a user of the terminal, the terminal may discard or reject the request of the network entity. If whether or not the user allows a type of context information is not determined yet, the terminal may inquire of the user about whether or not the type of the context information is allowed.

The network entity provides a service to the terminal by utilizing the context information received from the terminal. Specifically, the network entity can utilize the context information for scheduling the terminal, allocating a resource, and the like. For example, the terminal can inform the network entity of schedule information (specifically, time and location information) of a user as the context information. Having received the context information, the network entity can anticipate the amount of data access to be occurred at specific location at specific timing based on schedule information collected from terminals which have accessed a network of the network entity. Moreover, the network entity can perform resource reservation based on the anticipated result. The network entity can perform the resource reservation in consideration of frequency amount to be used by cells of a corresponding area.

A certain frequency spectrum can be flexibly assigned via auction between service providers in a time unit instead of being fixedly assigned to a specific service provider. In this case, if a frequency amount assigned to a service provider of a network at specific time and a specific region is less than the sum of frequency amounts required by terminals supported by the service provider, the service provider may want to additionally receive a spectrum.

As a different example, a terminal having a special purpose may inform a network entity of context information indicating a moving path of the terminal. The special terminals can inform the network entity of information on a moving path of the terminal and information on time taken for moving permitted by a related organization.

The network entity allocates and reserves a network resource to be provided to the terminal based on the information on the moving path and the information on the moving time received from the terminal. Specifically, the network entity checks cells through which the moving path of the terminal is passed and informs each of the cells of an amount of resource to be allocated to the terminal and resource allocation timing. A resource is allocated to each of the cells in advance. Each of the cells reserves a resource in advance for the terminal and informs the network entity of a result of the resource reservation. If a resource to be allocated to the terminal is reserved, the network entity informs the terminal of information on the reserved resource. For example, the network entity can inform the terminal of information on a cell from which a resource is to be allocated and timing of resource allocation. When the terminal moves along with a moving path, the terminal receives a resource from the network in a manner of being connected with the network based on the information received from the network entity and receives a service from the network.

Figure 10:
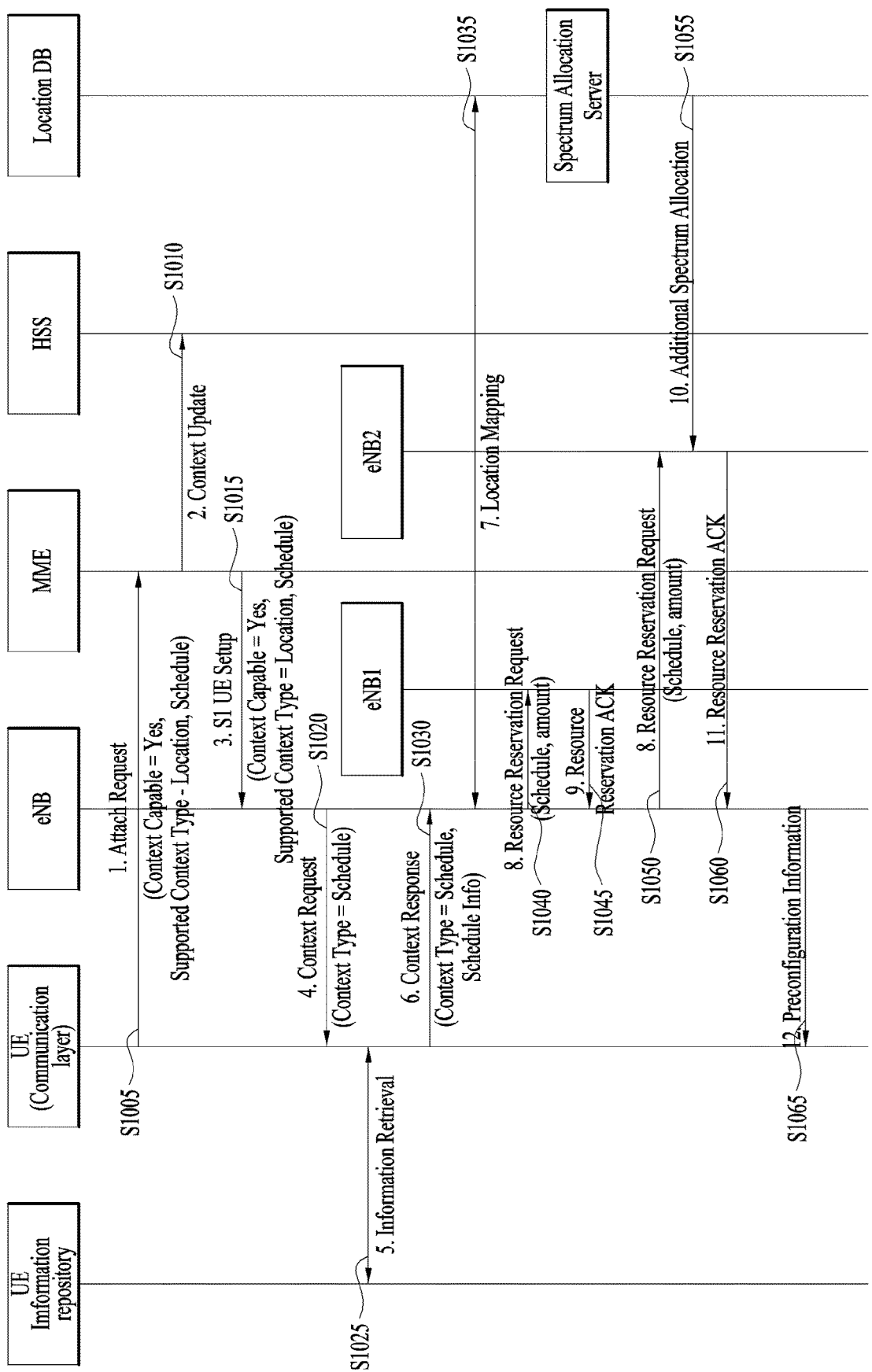
FIG. 10 is a flowchart for explaining a further different embodiment related to a proposed V2X communication method.

In FIG. 10, the aforementioned procedures are explained in detail. An embodiment shown in FIG. 10 explains a procedure of optimizing a network parameter or a radio parameter by processing information obtained from layers other than a communication layer of a terminal via a framework of the communication layer without depending on an application server.

First of all, a terminal performs a procedure of attaching to a network. The terminal transmits an attach request message to an MME [S1005]. In this case, the attach request message can include information on context capability of the terminal. FIG. 10 illustrates an example of information (context capable=yes) indicating that the terminal is able to inform the network of the context capability information. According to one embodiment of the present invention, when the terminal transmits the attach request message to the MME, the terminal can also inform the MME of a type of context information capable of being supported by the terminal. FIG. 10 illustrates an example that the terminal is able to inform the MME of location information and schedule information.

Meanwhile, the terminal can inform a network of context information by mapping the context information to a prescribed value according to a type of the context information. For example, location information and schedule information can be mapped to '0001' and '0002', respectively. In order for the terminal to indicate context information supported by the terminal, the terminal can transmit information indicating the '0001' and the '0002' to the MME.

The MME checks that the terminal has context capability based on the information included in the attach request message received from the terminal and checks that the terminal is able to support location information and schedule information. The MME compares the information with information preoccupied by the MME. If necessary, the MME updates information relates to the context of the terminal and forwards context-related information to an HSS [S1010].

Subsequently, the MME performs an S1 UE setup procedure to an eNB to forward the context-related information of the terminal to the eNB [S1015]. In this case, the MME can transmit a message including context capability information and context type information of the terminal to the eNB.

The eNB recognizes that the terminal is able to transmit context information based on the information received form the MME. Hence, the eNB additionally transmits a context request message to the terminal to ask the terminal to transmit context information [S1020]. In this case, the eNB designates a specific context type (e.g., 'schedule information' or '0002') among the context information supported by the terminal to indicate the terminal to transmit schedule information of a user.

Having received the context request message, the terminal collects information related to the schedule information of the user from a storing region of the terminal, a memory, an application, a sensor, and the like and coverts the collected information into a designated format. The terminal includes the schedule information in a context response message and transmits the context response message to the eNB [S1030].

The eNB checks eNBs related to the movement of the terminal using the information received from the terminal. For example, each service provider can separately configure a DB to manage information of eNBs related to a specific location and the eNB can inquire of the DB about an eNB related to the terminal [S1035].

If the eNBs related to the terminal are selected based on the context information of the terminal, the eNB transmits the context information of the terminal to the selected eNBs (eNB 1 and eNB2) [S1040, S1050]. This procedure can be performed via a procedure of transmitting a resource reservation message. The resource reservation message can include time anticipated according to a schedule of the terminal and information on an anticipated resource amount.

Having received the resource reservation message, the eNB1 determines that the eNB1 has no problem in supporting the terminal in consideration of a resource management status of the eNB 1. Subsequently, the eNB 1 transmits a resource reservation response message to the eNB and checks that a resource is reserved [S1045].

Having received the resource reservation message, the eNB 2 anticipates that resources of the eNB 2 are going to be insufficient when the terminal enters a region managed by the eNB 2. In this case, the eNB 2 accesses a server (in FIG. 10, spectrum allocation server) configured to manage radio resources and may ask the server to allocate an additional radio resource to the eNB 2 when the terminal enters the region managed by the eNB 2 [S1055]. The eNB 2 can prevent a shortage of radio resources in advance via the aforementioned procedure. The eNB 2 asks the server to allocate a radio resource and may be than able to transmit a resource reservation response message to the eNB to indicate that a resource has been reserved [S1060].

The eNB can optionally forward a result for the steps S1040 to S1060 to the terminal [S1065]. For example, the eNB 1 and the eNB 2 set a radio parameter (e.g., C-RNTI, etc.) to the terminal at the timing according to schedule information of a user and can transmit preconfigured information to the eNB. When the eNB transmits the radio parameter, which is included in the information received from the eNB 1 and the eNB 2, to the terminal, if the terminal enters regions managed by the eNB 1 and the eNB 2, the terminal may be able to immediately use preassigned C-RNTI without additionally performing cell update or a handover procedure. For example, if a radio resource allocation message is transmitted using C-RNTI preassigned by the eNB 1, the terminal can receive the radio resource allocation message using predetermined C-RNTI.

According to one embodiment of the present invention, if context capability information is included in the attach request message mentioned earlier in the step S1005, the attach request message can be implemented as shown in Table 2 in the following. In Table 2, a context capability list field can include values indicating types of context information capable of being supported by the terminal.

TABLE 2

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | ... | ... | ... | ... | ... |
| | UE Context Capability | Context Capability List | O | TLV | |

In the following, a method of supplementing the aforementioned embodiment is explained. In the foregoing description, a process that a terminal transceives information with a network entity in a manner that a code (or, a value) is mapped to each context type and the code is transmitted and received in a signaling procedure has been explained. Yet, as a terminal is evolving, a context type supported by each release can be differentiated. Simply, the number of context types supported by a recently released terminal could be less than the number of context types supported by a terminal to be released in several years. It is the same for a network entity including an eNB. For example, a terminal supports context codes '0001' and '0002' only, whereas a network entity supports '0001', '0002', and '0003'. An opposite case is also available.

Due to the mismatch, if the network entity requests information on a context code not supported by the terminal, the terminal may consider it as an error occurs on context capability forwarded to a network by the terminal. In this case, the terminal immediately retransmits the information on the context capability of the terminal to the network. In general, the terminal transmits the information on the context capability to an eNB after a request for the information is received from the eNB. Hence, if the information is received from the terminal although the information is not requested, the eNB considers it as an error occurs and disconnects an RRC connection. In order to solve the problem, if the eNB asks the terminal to transmit a context type not supported by the terminal, the terminal immediately transmits information on context types supported by the terminal to the eNB. Moreover, the terminal includes a value indicating 'receptionOfIncorrectType' in an updateCuase field of a message and transmits the message. By doing so, the terminal can inform the eNB that the eNB has requested an incorrect context type to the terminal. By doing so, it may be able to resolve a problem that the eNB disconnects an RRC connection with the terminal.

In the following, a different embodiment is explained. In the foregoing embodiments, the eNB requests schedule information of the terminal to reserve resources of eNBs in advance according to a movement of the terminal. Yet, when the eNB reserves resources of the eNB 1 and the eNB 2 according to information received from the terminal, the eNB 1 or the eNB 2 may fails to reserve a resource in accordance with moving timing of the terminal. In this case, the eNB may inform the terminal of the reservation failure. In a legacy communication system, since a communication network was unable to know context information such as movement information of the terminal, the terminal recognizes a shortage of resource via an attach failure only after the terminal moves to a cell where resources are practically insufficient. On the contrary, according to the aforementioned embodiment, the eNB informs the terminal that it is unable to reserve a resource of the eNB 1 or a resource of the eNB 2 and attempts to reserve a radio resource to a different eNB other than the two eNBs or informs the terminal that radio access is not smooth at corresponding timing. In this case, the terminal does not perform an operation of worsening a shortage of radio resource such as an operation of unnecessarily attempting to perform radio access in regions managed by the eNB 1 and the eNB 2.

A procedure for the eNB to inform the terminal of the failure of resource reservation can be performed in the step S1065 of FIG. 10. The eNB transmits a message including information such as 'preconfiguration failure' to the terminal and includes information on a region, an eNB or time at which a radio resource is not allocated in the message. When the radio resource reservation failure is notified to the terminal, if the terminal camps on the region or the eNB, the terminal does not perform a new RRC connection request procedure during designated time.

In the foregoing description, the terminal transmits context information to the network via a procedure of transmitting an attach request message to the MME. On the contrary, it may update an eNB only except the MME according to a selection of a service provider. In this case, in order to make the eNB utilize the context information of the terminal, it is necessary for the eNB to directly ask the terminal to transmit context capability. In particular, if the eNB sets such an item as 'ContextCapability' to a 'UECapabilityEnquiry' message and transmits the message to the terminal, the terminal transmits a 'UECapabilityInformation' message including a context type supported by the terminal to the eNB.

Table 3 in the following shows an example of implementing the 'UECapabilityEnquiry' message via RRC signaling and Table 4 in the following shows an example of implementing the 'UECapabilityInformation' message via RRC signaling.

TABLE 3

-UECapabilityEnquiry
The UECapabilityEnquiry message is used to request the transfer of UE radio access capabilities for E-UTRA as well as for other RATs.
Signalling radio bearer: SRB1
RLC-SAP: AM
Logical channel: DCCH
Direction: E-UTRAN to UE
UECapabilityEnquiry message
  -- ASN1START
    UECapabilityEnquiry ::=                    SEQUENCE {
       rrc-TransactionIdentifier           RRC-TransactionIdentifier,
       criticalExtensions                     CHOICE {
          c1
        CHOICE {

TABLE 3-continued

```
                ueCapabilityEnquiry-r8
        UECapabilityEnquiry-r8-IEs,
                    spare3 NULL, spare2 NULL, spare1 NULL
            },
            criticalExtensionsFuture        SEQUENCE { }
        }
    }
    UECapabilityEnquiry-v1310-IEs ::= SEQUENCE {
    nonCriticalExtensio                     UECapabilityEnquiry-
    V1XYZ-IEs { }                                     OPTIONAL
    }
    UECapabilityEnquiry-v1XYZ-IEs ::=       SEQUENCE {
        requestedContextCapability          ENUMERATED {true}
                                            OPTIONAL,
            updateCause
            ENUMERATED (receptionofincorrectType,reserved,reserved,reserved)
            nonCriticalExtension            SEQUENCE
                            OPTIONAL
    }
    UE-CapabilityRequest ::=                SEQUENCE   (SIZE   (1..maxRAT-
    Capabilities)) OF RAT-Type
    -- ASN1STOP
UECapabilityEnquiry field descriptions
- requestedContextCapability
indicates that the UE shall excplicitly indicate whether it supported context reporting.
```

TABLE 4

```
-UECapabilityInformation
The UECapabilityInformation message is used to transfer of UE radio access
capabilities requested by the E-UTRAN.
Signalling radio bearer: SRB1
RLC-SAP: AM
Logical channel: DCCH
Direction: UE to E-UTRAN
UECapabilityInformation message
    -- ASN1START
    UECapabilityInformation-v1250-IEs ::= SEQUENCE {
        ue-RadioPagingInfo-r12              UE-RadioPagingInfo-r12
                    OPTIONAL,
        nonCriticalExtension                UECapabilityInformation-
    v1XYZ-IEs { }                                     OPTIONAL
    }
    UECapabilityInformation-v1XYZ-IEs ::= SEQUENCE {
        ue-contextCapabilityInfo            UE-
    ContextCapabilityInfo                   OPTIONAL,
        nonCriticalExtension                SEQUENCE { }
                            OPTIONAL
    }
    UE-ContextCapabilityInfo :: = SEQUENCE {
        supportedCapabilityInfo      ENUMERATED {true} OPTIONAL,
        supportedCapabilityType      SEQUENCE   (SIZE   (1..maxType-Context))
    OF ContextType
    }
    -- ASN1STOP
UECapabilityInformation field descriptions
-SupportedCapabilityInfo
Indicates whether the UE supported Context Reporting
-ContextType
Indicates the supported context reporting.
I.e., 0001 indicates location, 0002 indicates schedule, 0003 etc
```

Figure 11:
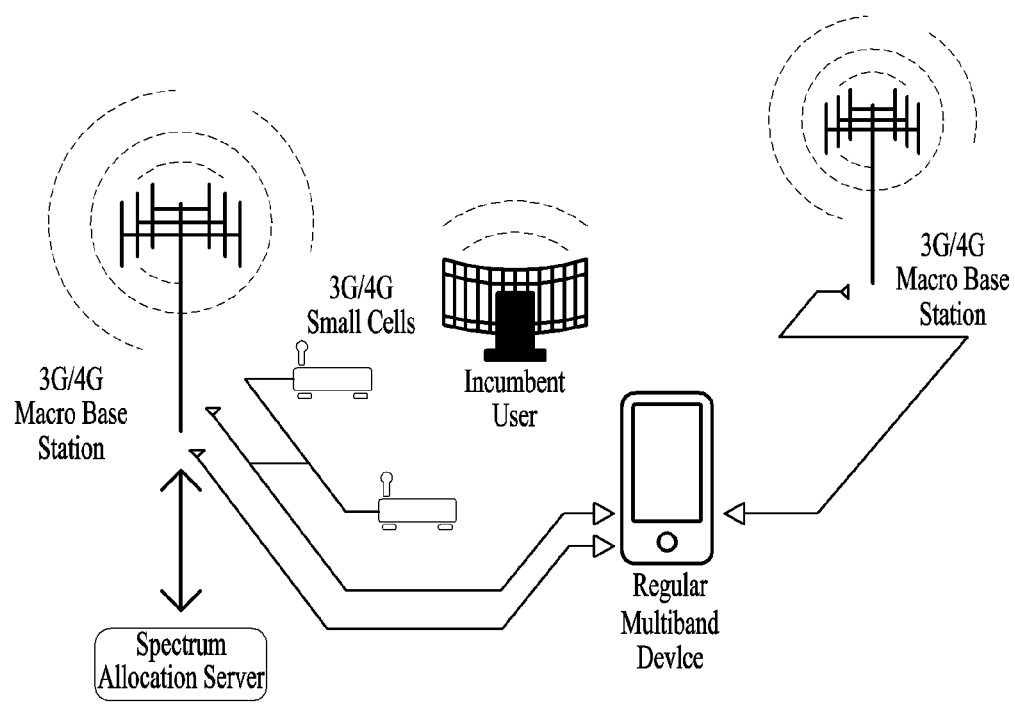
FIG. 11 is a flowchart for explaining a further different embodiment related to a proposed V2X communication method.

FIG. 11 is a diagram for explaining a server (a spectrum allocation server mentioned earlier in FIG. 10) configured to manage a radio resource.

As a mobile internet service continues to expand, discussion on a concept such as LSA (Licensed Shared Access) and ASA (Authorized Shared Access) is in progress. According to a legacy mobile communication network model, if government assigns a frequency to a mobile communication service provider, the service provider provides a communication service to a user based on the assigned frequency. In this case, since the number of subscribers is different according to a region, the amount of frequencies required by a service provider is different according to a region. And, one service provider may require more frequencies at a specific region at specific time according to a characteristic of a subscriber, whereas another service provider may not. According to a legacy frequency assignment model, although a frequency requirement is variously changed over time, since the fixed and constant amount of frequencies are assigned, frequency resources are inefficiently used.

Discussion on the introduction of the LSA/ASA is in progress in the United States and the Europe centering on 3.5 GHz and 2.5 GHz bands. For example, in the United States, since 3.5 GHz band is used by a coast guard, the band is necessary in a coast area only. Hence, the frequency band can be assigned for the use of mobile communication in an inland area. And, even in a coast area, a frequency is necessary only when communication is practically performed between a ship and a coastguard station and the frequency is not necessary during other times. In particular, according to the LSA/ASA scheme, the frequency band is preferentially used by the coast guard and the frequency band is dynamically assigned to a mobile communication service provider during the time not used by the coast guard.

In particular, in order to provide a satisfactory mobile communication service to subscribers of a service provider, if a frequency fixedly assigned to the service provider is insufficient at a specific region, a temporary frequency can be additionally assigned to the service provider. To this end, the LSA/ASA may prepare a frequency allocation server (in FIG. 11, 'spectrum allocation server') and the frequency allocation server can temporarily assign a frequency to service providers when the service providers need an additional frequency.

Meanwhile, when the abovementioned operation is performed, it is necessary for a network service provider to receive a frequency from a frequency allocation server before a shortage of frequency actually occurs. To this end, it is important for a mobile communication service provider to anticipate the timing at which a demand of frequency is generated. In particular, it is important for network entities to utilize the context information of the terminal according to the aforementioned embodiments.

It is able to efficiently utilize frequencies by utilizing the context information of the terminal in a mobile communication system through the aforementioned embodiments. Moreover, it is able to solve a problem of unnecessarily securing a frequency as well.

Figure 12:
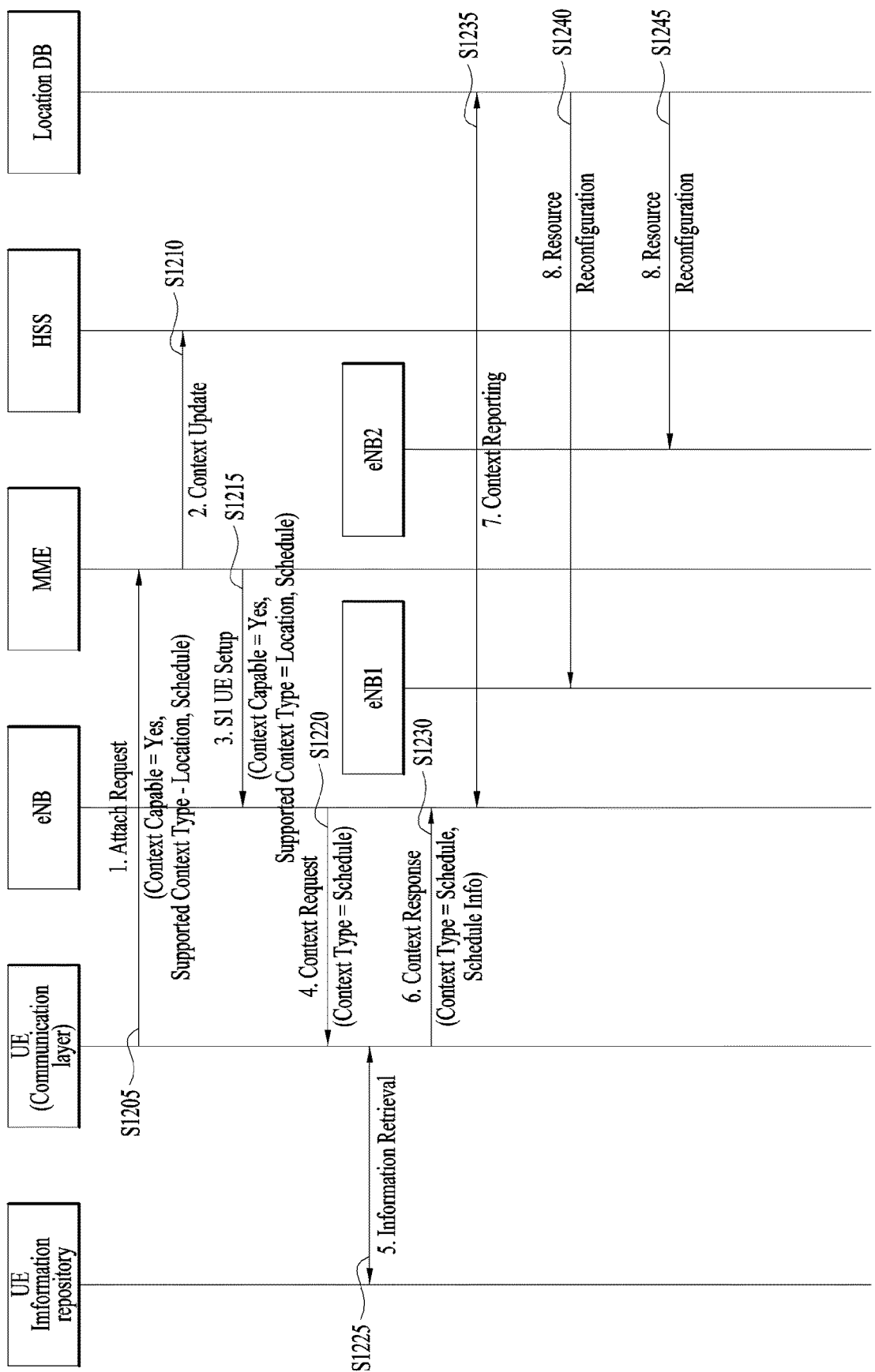
FIG. 12 is a flowchart for explaining a further different embodiment related to a proposed V2X communication method.

FIG. 12 illustrates a further different embodiment corresponding to a variation of the proposed embodiment.

Discussion on various concepts for more flexibly using a system resource is in progress in a next generation 5G communication system. For example, the concepts may include NFV (Network Function Virtualization), SDN (Software Defined Radio), Network slicing, and the like.

According to a legacy communication system, each of nodes is implemented by a dedicatedly configured and designed hardware device. For example, such a node as an MME, an SGW, an eNB, or the like is implemented by a single physical device. Hence, it is necessary for a service provider intending to configure a simple network to have an MME, an SGW, and an eNB, respectively. Subsequently, if the number of service subscribers increases, the service provider may have an additional network entity by anticipating user demand and configure a network.

For example, assume a case that an MME supports 100 users, an SGW supports 50 users or 100 Mbps, and an eNB supports 50 Mbps. If a service provider secures 50 users and each of the users use average 1 Mbps, the MME/SGW/eNB can averagely support all of the users. Yet, depending on a situation, if a request for a specific video is explosively increased and demand of users is increased up to 2 Mbps, capacity of the eNB becomes insufficient. Hence, the service provider installs 2 eNBs by assuming a worst scenario. However, this also cause a problem. Due to the movement of the users or a geographical difference, the users may not be evenly distributed to the two eNBs. It is necessary for the service provider to avoid a worst situation by additionally installing an eNB in consideration of the abovementioned case.

Yet, in case of considering average data use amount of a user, it may frequently have a chance of not using the additionally installed eNBs or may have load not reaching the maximum design value. Hence, the additionally installed eNBs may become a reason of investment waste for the service provider. In case of considering roaming of a user, a subscriber of a different service provider may access a network of the service provider. Hence, it is necessary for the service provider to additionally install an SGW in preparation for the roaming of the user. In case of considering a case that the service provider continuously secures a subscriber, it is necessary for the service provider to additionally install an SGW. In this situation, the SGW is also used with a rate lower than an acceptance value of the service provider.

In summary, since nodes are fixed in a hardware manner in a legacy system, it was not able to make the best use of each hardware capability. This problem is burden to management cost and installation cost of a service provider.

Yet, in recent years, a cloud concept has been developed centering on internet service providers. In particular, an internet service provider implements software of the internet service provider not directly managing an internet server device but using hardware of a cloud service provider and pays cost for as much as an amount of using a hardware resource. By doing so, the internet service providers can reduce hardware installation cost and management cost.

Similarly, a cloud concept has been introduced to a process of designing 5G communication system. In particular, hardware and a network resource are flexibly managed using cloud and a resource is flexibly used according to each network load. Specifically, if resources of an eNB are insufficient (i.e., if the number of users allocated to the eNB increases or average data use amount increases), the cloud increases the resource amount allocated to the eNB (e.g., network bandwidth, frequency amount, CPU calculation amount). On the contrary, if the resources of the eNB are left (i.e., if the number of users allocated to the eNB decreases or average data use amount decreases), the cloud decrease the resource amount allocated to the eNB.

In a broad sense, if terminals belonging to a specific service provider perform more signaling-related procedures, it may deploy more cloud resources to an MME and deploy less resource to an eNB, and vice versa. In particular, it may have various configurations. It is advantageous in that it is able to easily control resources of network entities at any time compared to a case of increasing a physical node. In particular, according to a legacy scheme, if resources of an eNB are not sufficient, there is a burden that a new physical eNB is practically deployed. On the contrary, if resources are managed in a software manner using a cloud scheme, it may be able to deploy an additional eNB within seconds or easily increase capacity of a legacy eNB.

Legacy network devices are physically separated and designed and manufactured in a manner of being optimized to each node, because of legacy CPU performance. In particular, since the CPU performance is low, a DSP (digital signal processor) optimized for a role of each node is used and a very fast wired backbone network configuration was expensive. Yet, as the CPU performance is developing and network backbone performance is enhanced, the cloud scheme becomes available in a communication system as well.

In particular, since network resources are used via a cloud scheme, it is necessary for a service provider to optimize a procedure of distributing resources to each network node and a procedure of adding/eliminating a resource according to a necessity. For example, in case of a housing area and a commercial area, people stay at the housing area from night to morning and stay at the commercial area such as office, school, and the like from morning till night. In this case, a network service provider may add physical eNBs in a manner that the service provider distributes more radio resources to the commercial area during the daytime and distributes more radio resources to the housing area at night. As a different example, it may distribute more radio resources to outdoor (valley, beach, etc.) in the summer and distribute more radio resources to indoor in the winter.

In order to perform the abovementioned scheme, it is necessary for a service provider and a network to utilize contexts of users. In particular, if schedule information corresponding to context information transmitted by a terminal is forwarded to a network, the network is able to know a data amount required by a user at a certain region. Based on this, the network is able to determine a region to which a cloud resource is to be additionally allocated and an amount of the cloud resource. Moreover, the network can determine an amount of resources to be additionally secured.

FIG. 12 illustrates the aforementioned procedures. In FIG. 12, the steps S1205 to S1230 are similar or identical to the steps of FIG. 10, explanation on a specific procedure is omitted at this time.

If an eNB obtains context information of a terminal according to signaling with the terminal, the eNB forwards the context information of the terminal to a resource management node configured to manage a network resource [S1235]. The resource management node shown in FIG. 12 may correspond to a spectrum allocation server or the aforementioned network node configured to manage the cloud resource. The resource management node determines a network entity where resource allocation is to be controlled using the received context information.

The resource management node additionally allocates a resource to an eNB 1 based on context information indicating that the terminal is going to move to a region related to the eNB 1 [S1240]. Or, if the eNB 1 has an upper limit of radio resources, the resource management server may allocate a radio resource or an additional cell to a different eNB which is positioned at a region at which the eNB 1 is located. And, the resource management node may reserve radio resource allocation for the terminal in an eNB 2 based on context information indicating that the terminal is going to move to a region at which the eNB 2 is located [S1245].

4. Device Configurations

Figure 13:
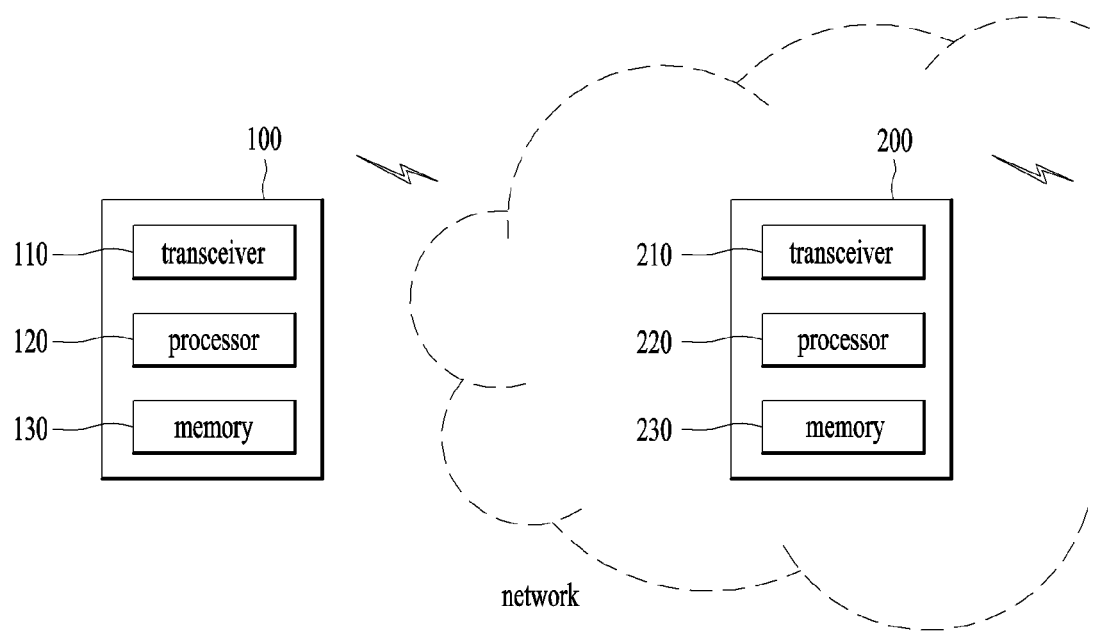
FIG. 13 is a diagram illustrating a configuration of a node device according to a proposed embodiment.

FIG. 13 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 13, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

Although the communication method are described centering on examples applied to 3GPP LTE system, it may also be applicable to various wireless communication systems including IEEE 802.16x and 802.11x system. Moreover, the proposed method can also be applied to mmWave communication system using a microwave frequency band.

What is claimed is:

1. A method of performing communication, which is performed by a base station using context information of a terminal in a wireless communication system, the method comprising:

receiving a message comprising context capability information indicating whether or not the terminal provides context information and context type information indicating a type of the context information supported by the terminal from a network entity;

transmitting a context request message for requesting specific context information among the context information supported by the terminal to the terminal;

receiving from the terminal, a context response message comprising context information which is generated based on information generated in an application layer of the terminal;

based on the context information, selecting different base stations related to the terminal; and transmitting a resource reservation message for requesting reservation of a radio resource for the terminal to the selected different base stations, wherein the resource reservation message includes at least i) anticipated time in which the radio resource of each of the different base stations is to be used by the terminal and ii) anticipated amount of the radio resource of each of the different base stations being used by the terminal.

2. The method of claim 1, further comprising:

receiving a resource reservation response message informing that the reservation of the radio resource for the terminal is authorized from the different base stations; and informing the terminal of the completion of the reservation of the radio resource.

3. The method of claim 1, wherein the context information contained in the context response message comprises at least one selected from the group consisting of scheduling information, location information, and time information of a user of the terminal.

4. The method of claim 3, wherein the reservation of the radio resource is reserved for the terminal by a prescribed base station at a prescribed location at prescribed time according to the context information contained in the context response message.

5. The method of claim 1, wherein based on a base station among the different base stations being unable to reserve a radio resource according to the resource reservation message, the base station among the different base stations asks a network entity configured to manage radio resources to allocate an additional radio resource.

6. The method of claim 1, wherein the network entity corresponds to a mobile management entity (MME).

7. A base station performing communication using context information of a terminal in wireless communication environment, the base station comprising:

a transceiver; and
a processor that:

receives a message comprising context capability information indicating whether or not the terminal provides context information and context type information indicating a type of the context information supported by the terminal from a network entity;

transmits a context request message for requesting specific context information among the context information supported by the terminal to the terminal;

receives from the terminal, a context response message comprising context information which is generated based on information generated in an application layer of the terminal;

based on the context information, selects different base stations related to the terminal; and transmits a resource reservation message for requesting reservation of a radio resource for the terminal to the selected different base stations, wherein the resource reservation message includes at least i) anticipated time in which the radio resource of each of the different base stations is to be used by the terminal and ii) anticipated amount of the radio resource of each of the different base stations being used by the terminal.

8. The base station of claim 7, wherein the processor receives a resource reservation response message informing that the reservation of the radio resource for the terminal is authorized from the different base stations and inform the terminal of the completion of the reservation of the radio resource.

9. The base station of claim 7, wherein the context information contained in the context response message comprises at least one selected from the group consisting of scheduling information, location information, and time information of a user of the terminal.

10. The base station of claim 9, wherein the reservation of the radio resource is reserved for the terminal by a prescribed base station at a prescribed location at prescribed time according to the context information contained in the context response message.

11. The base station of claim 7, wherein based on a base station among the different base stations being unable to reserve a radio resource according to the resource reservation message, the base station among the different base stations asks a network entity configured to manage radio resources to allocate an additional radio resource.

12. The base station of claim 7, wherein the network entity corresponds to a mobile management entity (MME).

* * * * *